Nov. 27, 1923. 1,475,650
F. OSBORNE
GLASS MELTING POT
Filed May 25, 1921
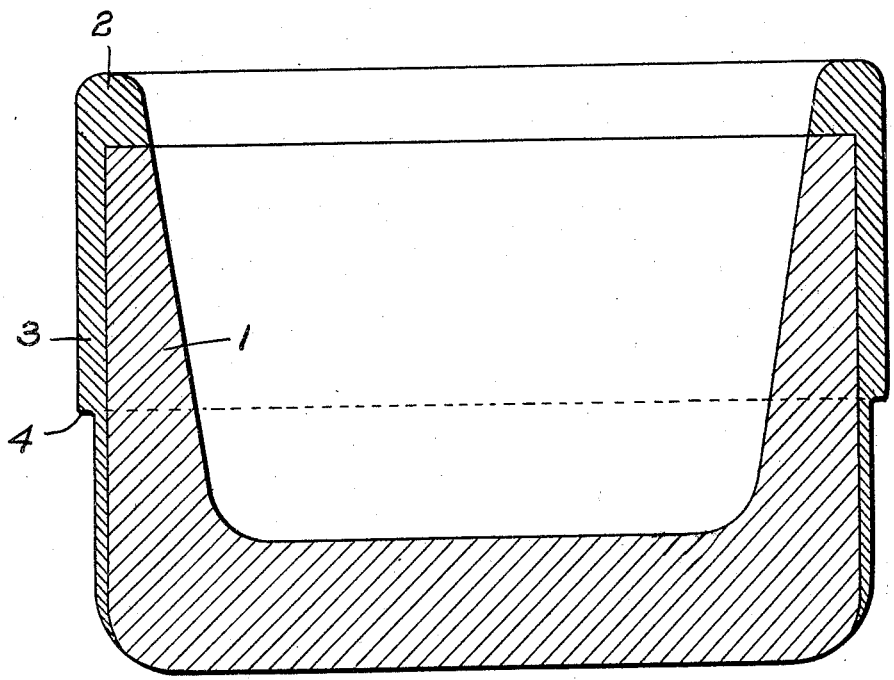
INVENTOR
Frank Osborne.
by
James C. Bradley,
Atty.

Patented Nov. 27, 1923.

1,475,650

UNITED STATES PATENT OFFICE.

FRANK OSBORNE, OF FORD CITY, PENNSYLVANIA, ASSIGNOR TO PITTSBURGH PLATE GLASS COMPANY, A CORPORATION OF PENNSYLVANIA.

GLASS-MELTING POT.

Application filed May 25, 1921. Serial No. 472,476.

*To all whom it may concern:*

Be it known that I, FRANK OSBORNE, a citizen of the United States, and a resident of Ford City, in the county of Armstrong and State of Pennsylvania, have made a new and useful invention in Improvements in Glass-Melting Pots, of which the following is a specification:

The invention relates to clay pots for use in melting glass and particularly for use in connection with the manufacture of plate glass, although not limited to use in such connection. It has for its principal object the provision of a pot especially adapted to withstand unusually severe heating and to give longer service than the ordinary plate glass pot. One embodiment of the invention is illustrated in the accompanying drawing, wherein:—

The figure is a vertical section through a pot made in accordance with the invention.

The invention is directed primarily towards giving the pot additional heat resisting and wearing qualities at those points where failure is very liable to occur. These points are the rim and to a somewhat less extent the outer surface of the pot. One of the largest defects contributing to the failure of the pots is what is known as "burnt rim," which means a failure of the rim due to overheating and blistering of the pot batch. The rim of the pot is exposed to the greatest heat and occasionally to a sharp oxidizing flame, and is thus more readily deformed and broken than any other part of the pot. The present invention is designed to overcome this difficulty by the provision of a batch composition for use in the rim and in the outer shell of the pot which is more refractory than ordinary pot clay. Such a composition is not suitable for the body portion of the pot because of the unfavorable reaction between the material and the glass which would affect the quality of the glass if any considerable area of such material were exposed to the action of the glass. This material will, however, stand up better under unusually high temperatures, being subject to less deformation and wasting away much less rapidly than ordinary pot clay.

The manner in which the two clays are combined in the pot will be seen by reference to the drawing, in which 1 is the body portion of the pot made of ordinary pot clay, while 2 is the rim and 3 is a protecting shell for the body portion, which parts are composed of a more refractory clay than the body portion 1. By pot clay is meant those clays which are ordinarily used in the construction of glass melting pots. These clays are for the most part secured in the vicinity of St. Louis, Missouri, being mixed in most cases with small quantities of bonding clays together with finely divided silica, as set forth in the patents to Charles H. Kerr, Numbers 1,217,956 and 1,278,164. The clay which is preferably used for the body portion 1 is that described in the latter Kerr patent above referred to, but the invention is not limited to the use of that particular clay for the body portion. The more refractory clay of the rim 2 and shell 3 is preferably made from a batch similar to that of the body portion 1 but without the silica addition as described in the Kerr patent. To this clay is added from 10% to 30% of a high grade flint clay which makes the composition much more refractory than the material of the body portion. The following is illustrative of the batch employed:

Raw pot clay and bond clay 35%.
Burnt pot clay and pot shell 45%.
Flint clay 20%.

It will be understood, however, that the invention is not limited to any such batch as that above stated, as the proportions of the ingredients and the ingredients themselves may be varied between relatively wide limits and still produce a satisfactory material for the rim and shell which is more refractory than the ordinary pot clay. Various materials other than the flint clay might be added to increase the refractoriness of the composition, such, for instance, as alundum or other aluminous refractories.

The shell 3 is preferably extended to a point at or adjacent to the bottom surface of the pot, so that the shoulder 4 is composed of more refractory material. This is an advantage as this shoulder tends to be worn or broken off in the course of time and the more refractory material resists this action. The rim 2 is preferably about four inches in depth, so that the surface line of the glass comes opposite this rim. The corrosion or washing away of the material is ordinarily greatest at this point and the special refractory composition resists this action better than the ordinary pot clay, so that the rim is more durable for this reason.

The pot is built up in the usual way, in spells or courses, the two compositions being worked along together and finally topped off with the rim 2, which, as above stated, is preferably about four inches in depth. The thickness of the shell 3 may be varied according to conditions, and the distance which such shell extends down upon the side of the pot may be modified under varying conditions. The pot is dried and fired or arched in the usual way. A relatively clear line of demarcation is shown in the drawing between the two batch compositions, constituting the body and the rim and shell, but it will be understood that in practice the two materials must necessarily merge into each other without any clear line of demarcation, due to the fact that the wall of the pot is built up or constructed by hand and the two materials must be compacted or worked together in order to form a homogeneous mass and avoid any tendency of cleavage along the line of division between the two materials.

In service pots constructed in accordance with the invention give longer service than pots constructed throughout of ordiary pot clay, this being largely due to the fact that the rim 2 is more durable, being less subject to corrosion and wasting away, and less subject to deformation and blistering incident to the high temperature to which the pot is exposed. The pot is somewhat stiffer in its upper portion and the shoulder 4 is more durable than is the case with the ordinary pot. These factors contribute to an average length of life which is greater than was attained before with pots made in the usual way of ordinary pot clay throughout.

What I claim is:

1. An open top plate glass melting pot having a body portion of pot clay and a rim of a clay which is more refractory than that of the body portion.

2. An open top plate glass melting pot having a body portion of pot clay and a rim of clay which contains a higher percentage of alumina than the body portion and which is more refractory than such body portion.

3. An open top plate glass melting pot having a body portion of pot clay and a rim of pot clay mixed with flint clay.

4. An open plate glass melting pot having a body portion of pot clay and a rim and an outer shell for the body portion of a clay which is more refractory than that of the body portion.

5. An open top plate glass melting pot provided with an annular shoulder and having a body portion of pot clay, and a rim and an outer shell for the body portion of a clay which is more refractory than that of the body portion, such shell extending down from the rim to a point below the shoulder of the pot.

In testimony whereof, I have hereunto subscribed my name this 9th day of May, 1921.

FRANK OSBORNE.